April 14, 1959 C. L. HANSON 2,881,957
BAFFLE PLATES FOR FERTILIZER DISTRIBUTOR
Filed Nov. 15, 1956 2 Sheets-Sheet 1
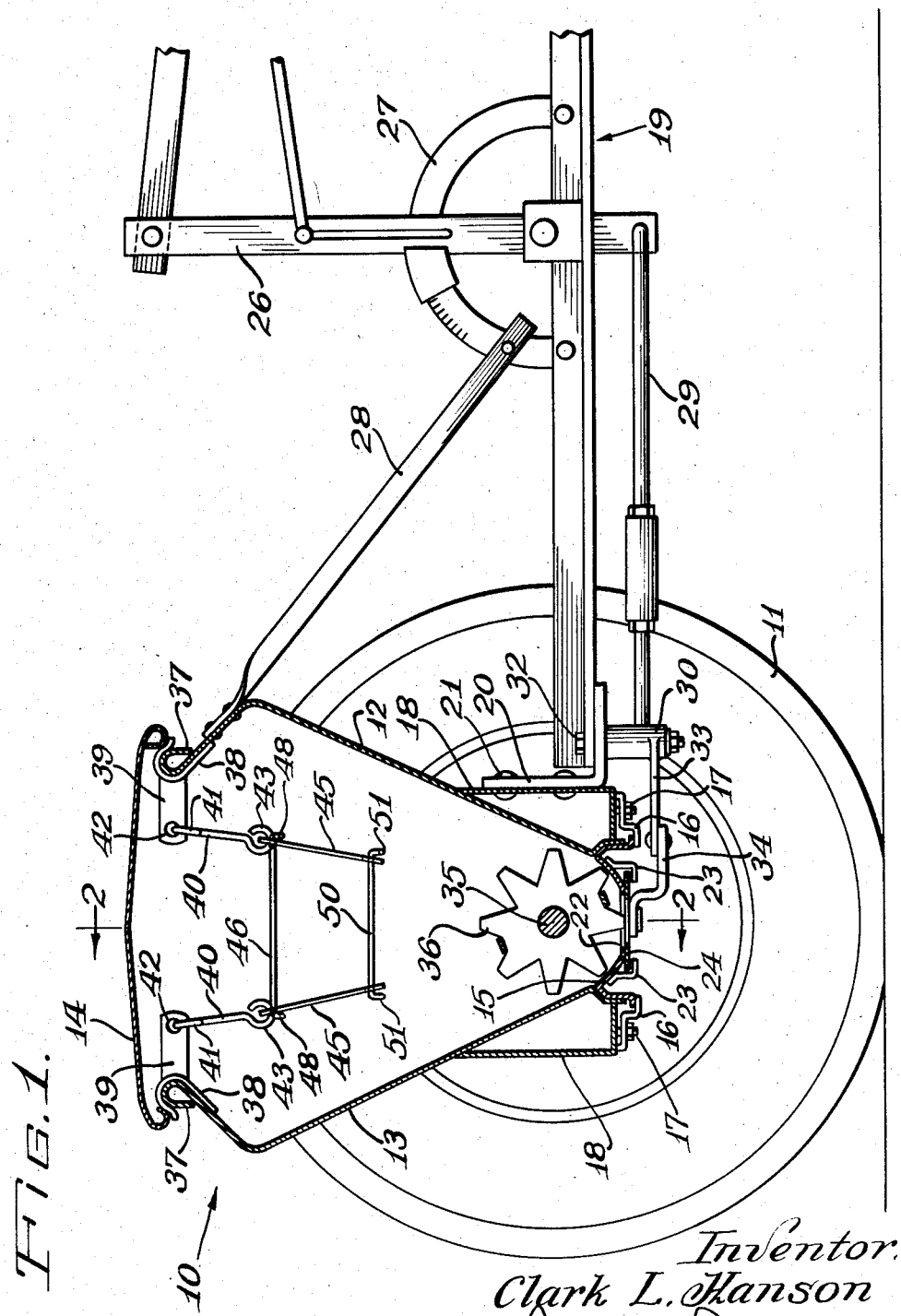
Inventor:
Clark L. Hanson
Paul O. Pipper
Atty.

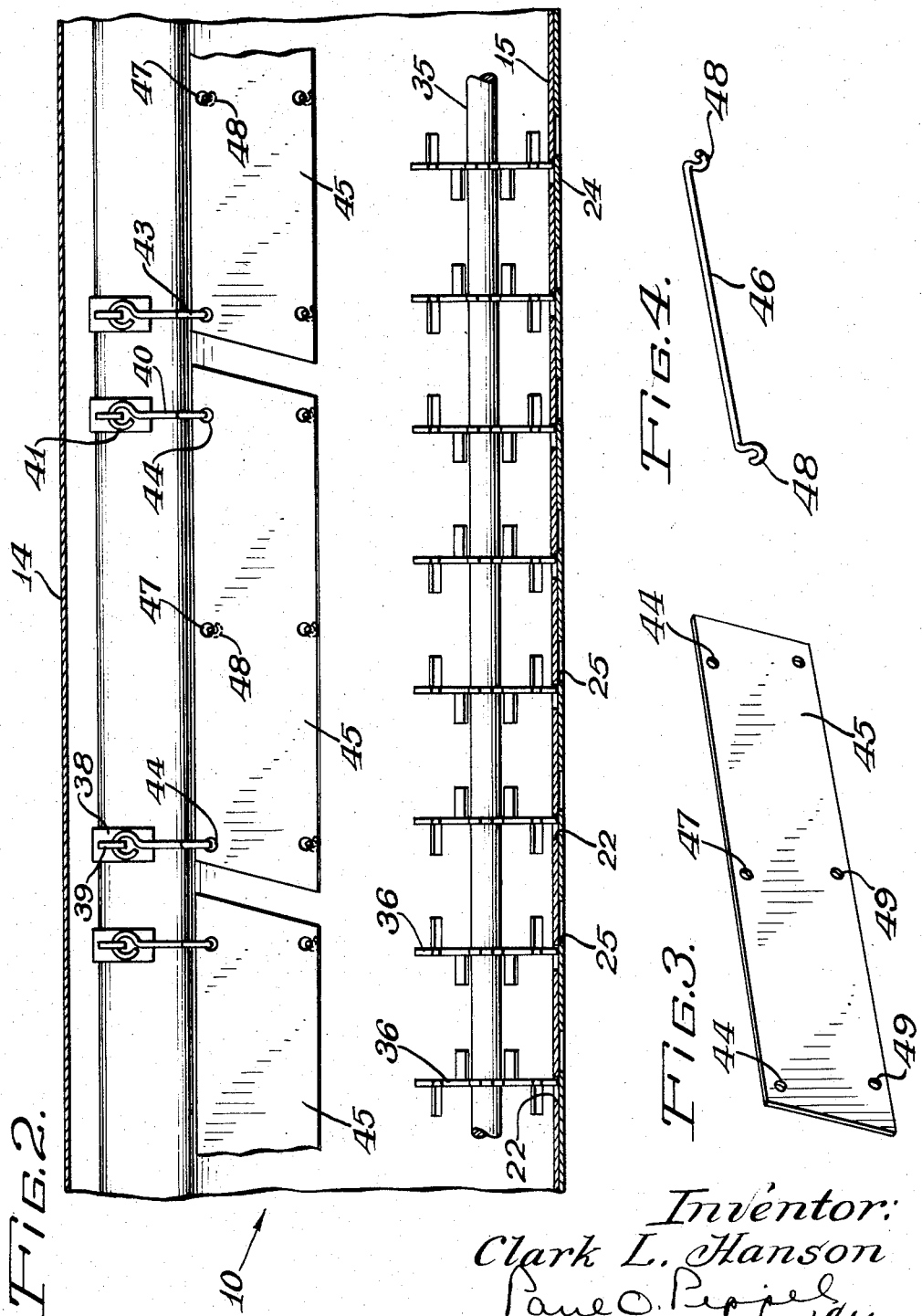

United States Patent Office 2,881,957
Patented Apr. 14, 1959

2,881,957

BAFFLE PLATES FOR FERTILIZER DISTRIBUTOR

Clark L. Hanson, Richmond, Ind., assignor to International Harvester Company, a corporation of New Jersey Application November 15, 1956, Serial No. 622,322

5 Claims. (Cl. 222—233)

This invention relates to agricultural implements and particularly to material dispensers such as for fertilizer and the like, and is described herein in its application to a fertilizer distributor of the elongated hopper type having an opening in the top to receive the fertilizer, adjustable openings in the bottom for the discharge of metered quantities of fertilizer, and feed means for directing fertilizer to the outlets and keeping the fertilizer flowing therethrough.

In conventional hoppers of the type referred to, commercial fertilizer tends to become compacted and to bridge the agitating and the feed elements, and the present invention has for its object the provision of novel means in the hopper which is adapted to inhibit compacting of the material and to keep it in a loose, flowing state.

Another object of the invention is the provision of an improved fertilizer distributor having novel means in the hopper independent of the agitators and feed devices, adapted to offset the tendency of the fertilizer to bridge over the feed devices and discharge outlets.

Another object of the invention is the provision in a fertilizer distributor of novel means in the form of baffle plates suspended in the fertilizer in the hopper, wherein the plates converge downwardly slightly, sufficient to shed the fertilizer in contact with the surface of the plates while providing a partial support for the fertilizer between the plates to relieve the weight of the fertilizer in the hopper on the discharge devices in the bottom.

Other objects and advantages of the invention will become clear from the following detailed description when read in conjunction with the accompanying drawings, wherein:

Figure 1 is a view in side elevation, partly in section, of a fertilizer distributor incorporating the features of this invention;

Figure 2 is a section taken on the line 2—2 of Figure 1;

Figure 3 is a view in perspective of one of the baffle plate elements; and

Figure 4 is a view in perspective of one of the connecting rods between the plates.

Referring to the drawings, the numeral 10 designates an elongated fertilizer hopper which extends transversely of the direction of travel and is supported at each end by a ground wheel 11, only one of which is shown. The hopper 10 includes downwardly converging front and rear side walls 12 and 13, a hinged cover or lid 14 and a bottom portion 15, which is removable but held in place by clips 16 secured by bolts 17 to triangularly shaped braces 18.

The fertilizer distributor of this invention further includes a hitch structure 19 adapted for connection at its forward end to a tractive vehicle to be propelled thereby, and not shown, and having at its rear end an angle plate 20 secured to the forward brace 18 by bolts 21.

The bottom 15 of the hopper 10 is flattened and provided with a plurality of discharge outlets 22 for the passage therethrough of fertilizer in the hopper. Clips 23 are provided and secured to the hopper bottom 15 to slidably receive a plate 24 which engages the bottom of the hopper and is also provided with a plurality of openings 25 adapted to be moved from positions such as shown in Figure 2 to positions in registry with the openings 22 in the bottom plate 15 for the discharge of selected quantities of fertilizer from the hopper.

Adjustment of the slide 24 longitudinally of the hopper to regulate the quantity of fertilizer discharged therefrom is made by conventional adjusting means, which forms no part of this invention, but which briefly includes a lever 26 pivotally mounted on the hitch 19 and movable over a quadrant 27 connected by a brace 28 with the upper portion of the hopper. A part of lever 26 projecting below the hitch 19 is connected by a rod 29 to a sleeve 30 rockably mounted on a vertical bolt 32 carried by the rear end of the hitch frame 19 and having an arm 33 pivotally connected to a strap 34 which is, in turn, pivotally connected to the slide plate 24. Thus movement of lever 26 over quadrant 27 to selected positions adjusts the position of plate 24 relative to the bottom 15 of the hopper.

A feed shaft 35 at the bottom of the hopper is driven by the end wheels 11 and has mounted thereupon in registry with openings 22 in the hopper bottom, feed wheels 36, the operation of which is designed to keep the fertilizer flowing through the openings 22.

A simple device has been provided to overcome the tendency referred to hereinbefore of the fertilizer to become compacted and to bridge over the feed shaft 35 and wheels 36. As is clearly shown in Figure 1, the upper ends of walls 12 and 13 of the hopper converge upwardly and terminate in beads 37 upon which are mounted at spaced intervals the length of the hopper, a plurality of clamps 38 to which are affixed inwardly projecting arms 39. Each of the arms 39 supports a depending link 40, the upper end of which is provided with an eye 41 receivable in an opening 42 in the end of arm 39. The lower end of link 40 terminates in another eye 43, and each pair of eyes 43 lengthwise of the hopper is hooked into an opening 44 in the upper end of a baffle plate 45, a plurality of such baffle plates 45 being aligned longitudinally of the hopper.

The baffle plates 45 on each side of the hopper are arranged in somewhat downwardly converging relation, as shown in Figure 1, and the upper ends thereof are held in spaced relation by a plurality of rods 46 received in openings 47 centrally located in the upper end of each of the plates 45 and having opposite ends thereof bent to form stops 48 limiting movement of the plates 45 outwardly. The lower ends of plates 45 are provided with a plurality of apertures 49 adapted to receive rods 50 similar to rods 46 but somewhat shorter to cause the plates 45 to converge downwardly and having similar stops 51 in the form of hooks at the ends of the rods 50 to maintain this relationship of the plates.

Due to the manner of their suspension, baffle plates 45 are capable of swinging laterally as well as longitudinally of the hopper and due to their converging relationship relieve some of the weight of the material in the hopper. The baffle plates 45 prevent the fertilizer from compacting and inhibit the bridging thereof over the feed shaft 35 and the wheels 36, whereby the material is kept in a loose, freely flowing state so that it discharges uniformly from the openings in the bottom of the hopper.

The operation of the baffle plates of this invention should be clearly understood from the foregoing description. It should likewise be understood that the invention has been described in its preferred embodiment and that modifications may be made therein without departing from the spirit of the invention or the scope of the appended claims.

What is claimed is:

1. In an elongated fertilizer distributor hopper including side walls, an open top for the receipt of fertilizer, a bottom having outlets therein for the discharge of fertilizer and a feed shaft extending lengthwise of the hopper at the bottom thereof having means thereon for directing fertilizer into said outlets, means inhibiting the compacting of the fertilizer in the hopper and bridging of the feed shaft thereby comprising a pair of downwardly converging baffle plates extending lengthwise of said hopper in vertical planes parallel to and on opposite sides of said feed shaft, said plates being spaced from each other and from the adjacent sides of the hopper, means suspending said plates in said hopper for free translational swinging therein laterally and longitudinally of the hopper comprising supporting means secured to the hopper walls and extending inwardly therefrom, flexible means connected to said supporting means and depending therefrom, and means connecting said baffle plates to said flexible means.

2. In an elongated fertilizer distributor hopper including side walls, an open top for the receipt of fertilizer, a bottom having outlets therein for the discharge of fertilizer and a feed shaft extending lengthwise of the hopper at the bottom thereof having means thereon for directing fertilizer into said outlets, means inhibiting the compacting of the fertilizer in the hopper and bridging of the feed shaft thereby comprising a pair of downwardly converging baffle plates extending lengthwise of said hopper in vertical planes parallel to and on opposite sides of said feed shaft, said plates being spaced from each other and from the adjacent sides of the hopper, means suspending said plates in said hopper for free translational swinging therein comprising supporting means secured to the hopper walls and extending inwardly therefrom, flexible means connected to said supporting means and depending therefrom, means connecting said baffle plates to said flexible means, and connecting means between said plates for maintaining them in spaced downwardly converging relation in the hopper.

3. In an elongated fertilizer distributor hopper including side walls, an open top for the receipt of fertilizer, a bottom having outlets therein for the discharge of fertilizer and a feed shaft extending lengthwise of the hopper at the bottom thereof having means thereon for directing fertilizer into said outlets, means inhibiting the compacting of the fertilizer in the hopper and bridging of the feed shaft thereby comprising a pair of baffle plates extending lengthwise of said hopper in vertical planes parallel to and on opposite sides of said feed shaft, said plates being spaced from each other and from the adjacent sides of the hopper, means suspending said plates in said hopper for free translational swinging therein comprising supporting means secured to the hopper walls and extending inwardly therefrom, flexible means connected to said supporting means and depending therefrom, means connecting said baffle plates to said flexible means, and vertically spaced connecting members extending between and pivotally connected to said plates for holding them in spaced relation in the hopper while accommodating free swinging thereof.

4. The invention set forth in claim 3, wherein the lower of said vertically spaced connecting members are shorter than the upper connecting members whereby said baffle plates converge downwardly and support a portion of the weight of the fertilizer in the hopper between said plates.

5. The invention set forth in claim 4, wherein said connecting members are rods slidably received in openings provided in said baffle plates to allow the latter to move closer together but having stop means limiting the movement of the plates away from each other.

References Cited in the file of this patent

UNITED STATES PATENTS

| Number | Name | Date |
|---|---|---|
| 694,285 | Joyner et al. | Feb. 25, 1902 |
| 1,484,599 | Whitaker | Feb. 19, 1924 |
| 1,991,679 | Johnson | Feb. 19, 1935 |
| 2,011,340 | Lundy | Aug. 13, 1935 |
| 2,321,965 | Zimmerman | June 15, 1943 |
| 2,604,238 | Osgood | July 22, 1952 |
| 2,710,117 | Fritz et al. | June 7, 1955 |